(12) United States Patent
Herbert et al.

(10) Patent No.: US 8,799,428 B2
(45) Date of Patent: Aug. 5, 2014

(54) AUTOMATED PROVISIONING OF NEW NETWORKED DEVICES

(75) Inventors: Howard Herbert, Phoenix, AZ (US); Moshe Maor, Kiryat Mozkin (IL)

(73) Assignee: Intel Corporation, Santa Clara, CA (US)

( * ) Notice: Subject to any disclaimer, the term of this patent is extended or adjusted under 35 U.S.C. 154(b) by 875 days.

(21) Appl. No.: 11/026,712

(22) Filed: Dec. 30, 2004

(65) Prior Publication Data

US 2006/0168196 A1 Jul. 27, 2006

(51) Int. Cl.
*G06F 15/177* (2006.01)

(52) U.S. Cl.
USPC .......................................................... 709/222

(58) Field of Classification Search
USPC ......................................... 709/219, 222, 224
See application file for complete search history.

(56) References Cited

U.S. PATENT DOCUMENTS

| | | | |
|---|---|---|---|
| 5,136,711 A * | 8/1992 | Hugard et al. .................... 713/2 |
| 5,230,052 A | 7/1993 | Dayan et al. |
| 5,421,006 A | 5/1995 | Jablon |
| 5,444,764 A | 8/1995 | Galecki |
| 5,586,260 A | 12/1996 | Hu |
| 5,600,708 A | 2/1997 | Meche et al. |
| 5,680,547 A * | 10/1997 | Chang ........................... 709/222 |
| 5,699,595 A | 12/1997 | Feyerl |
| 5,815,652 A | 9/1998 | Ote et al. |
| 5,898,783 A | 4/1999 | Rohrbach |
| 5,944,822 A | 8/1999 | Cornils et al. |
| 6,212,635 B1 | 4/2001 | Reardon |
| 6,216,116 B1 | 4/2001 | Barkan et al. |
| 6,272,629 B1 * | 8/2001 | Stewart .............................. 713/2 |
| 6,304,970 B1 | 10/2001 | Bizzaro et al. |
| 6,466,972 B1 * | 10/2002 | Paul et al. ....................... 709/222 |
| 6,574,236 B1 | 6/2003 | Gosselin et al. |
| 6,574,736 B1 | 6/2003 | Andrews et al. |
| 6,611,915 B1 * | 8/2003 | Kubik et al. .................... 709/211 |
| 6,922,722 B1 * | 7/2005 | Mann et al. ..................... 709/220 |
| 7,051,242 B2 | 5/2006 | Naffziger |
| 7,089,451 B2 | 8/2006 | Ote et al. |
| 7,111,055 B2 * | 9/2006 | Falkner .......................... 709/221 |
| 7,185,192 B1 | 2/2007 | Kahn |
| 7,266,818 B2 * | 9/2007 | Pike et al. ...................... 717/176 |
| 7,284,120 B2 * | 10/2007 | Blouin et al. ...................... 713/2 |
| 7,302,698 B1 | 11/2007 | Proudler |

(Continued)

FOREIGN PATENT DOCUMENTS

| EP | 0 675 659 A1 | 10/1995 |
|---|---|---|
| EP | 1 220 556 A1 | 7/2002 |

(Continued)

OTHER PUBLICATIONS

PCT Search Report, PCT/US2005/046080, dated Apr. 20, 2006, 6 pages.

(Continued)

*Primary Examiner* — Scott Christensen
(74) *Attorney, Agent, or Firm* — Blakely, Sokoloff, Taylor & Zafman LLP (57) ABSTRACT

In one embodiment, a networked device includes a main platform having a processor, a memory and a basic input/output system (BIOS), and a management subsystem coupled to the main platform to provision the main platform irrespective of the presence of an operating system on the main platform.

14 Claims, 7 Drawing Sheets

(56) References Cited

U.S. PATENT DOCUMENTS

| | | | |
|---|---|---|---|
| 7,401,358 | B1 | 7/2008 | Christie et al. |
| 7,979,702 | B2 | 7/2011 | Herbert et al. |
| 2001/0020251 | A1* | 9/2001 | Sheikh et al. ............ 709/224 |
| 2003/0028633 | A1* | 2/2003 | Lindsay et al. ........... 709/224 |
| 2003/0069951 | A1* | 4/2003 | Fong et al. ............... 709/222 |
| 2003/0091042 | A1 | 5/2003 | Lor |
| 2003/0120820 | A1 | 6/2003 | Chen |
| 2003/0120827 | A1 | 6/2003 | Fulginiti et al. |
| 2004/0010654 | A1 | 1/2004 | Yasuda et al. |
| 2004/0039911 | A1 | 2/2004 | Oka et al. |
| 2004/0088402 | A1* | 5/2004 | Piepho et al. ............. 709/224 |
| 2004/0103175 | A1* | 5/2004 | Rothman et al. .......... 709/222 |
| 2004/0255169 | A1 | 12/2004 | Little |
| 2005/0091349 | A1* | 4/2005 | Scheibli .................... 709/222 |
| 2005/0267956 | A1 | 12/2005 | Huang |
| 2006/0143263 | A1* | 6/2006 | Kumar et al. ............. 709/201 |
| 2006/0168196 | A1 | 7/2006 | Herbert et al. |
| 2006/0182108 | A1 | 8/2006 | Krumel |

FOREIGN PATENT DOCUMENTS

| | | |
|---|---|---|
| EP | 1351137 A2 | 10/2003 |
| GB | 2 388 752 A | 11/2003 |
| JP | 2004-046661 | 12/2004 |
| TW | 292365 | 1/1996 |
| TW | 550508 | 12/2001 |
| TW | 567438 | 12/2003 |
| TW | 574651 | 2/2004 |
| WO | WO 2004/053618 A2 | 6/2004 |

OTHER PUBLICATIONS

PCT Search Report, PCT/US2005/046079, mailed Jun. 6, 2006, 5 pages.
PCT Search Report, PCT US2005/046573, 4 pages.
PCT Search Report, PCT US2005/045897, 4 pages.
Intel Corporation Office Action for U.S. Appl. No. 11/027,452 mailed Jul. 25, 2008.
Intel Corporation Office Action for U.S. Appl. No. 11/027,452 mailed Dec. 24, 2008.
Intel Corporation Office Action for U.S. Appl. No. 11/015,873 mailed Jan. 8, 2008.
Intel Corporation Office Action for U.S. Appl. No. 11/015,873 mailed Oct. 20, 2008.
Intel Corporation Office Action for U.S. Appl. No. 11/015,872 mailed Oct. 19, 2006.
Intel Corporation Office Action for U.S. Appl. No. 11/015,872 mailed Apr. 3, 2007.
Office Action for U.S. Appl. No. 11/027,452 mailed May 22, 2009.
Office Action for U.S. Appl. No. 11/015,872 mailed Feb. 8, 2008.
Office Action for U.S. Appl. No. 11/015,872 mailed Oct. 29, 2008.
TW 94147204; Office Action and Search Report, dated Mar. 4, 2008, 21 pages.
EP 05 854 741.5; Examination Report, dated May 28, 2009, 5 pages.
EP 05 854 741.5; Examination Report, dated Mar. 18, 2013, 7 pages.
PCT/US2005/046080; Written Opinion of the International Searching Authority, date of mailing Apr. 20, 2006, 5 pages.

* cited by examiner

AUTOMATED PROVISIONING OF NEW NETWORKED DEVICES

FIELD

Embodiments of the invention relate generally to device management, and more specifically to automated provisioning of networked devices.

BACKGROUND

When a business receives new network devices from an original equipment manufacturer (OEM), these devices do not become deployable until IT professionals manually enter various pieces of individual configuration data onto each device. In large enterprises with complex network infrastructures and security schemes, this adds up to considerable cost consumed by IT overhead. If such an enterprise has multiple sites that are geographically distant, IT professionals must often travel to facilitate deployment of new devices, and the travel expenses add to the cost of ownership.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DESCRIPTION OF EMBODIMENTS

A method and apparatus for provisioning new networked devices is described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe provisioning of new network devices in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

Thus, a machine-readable storage medium may include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Figure 1:
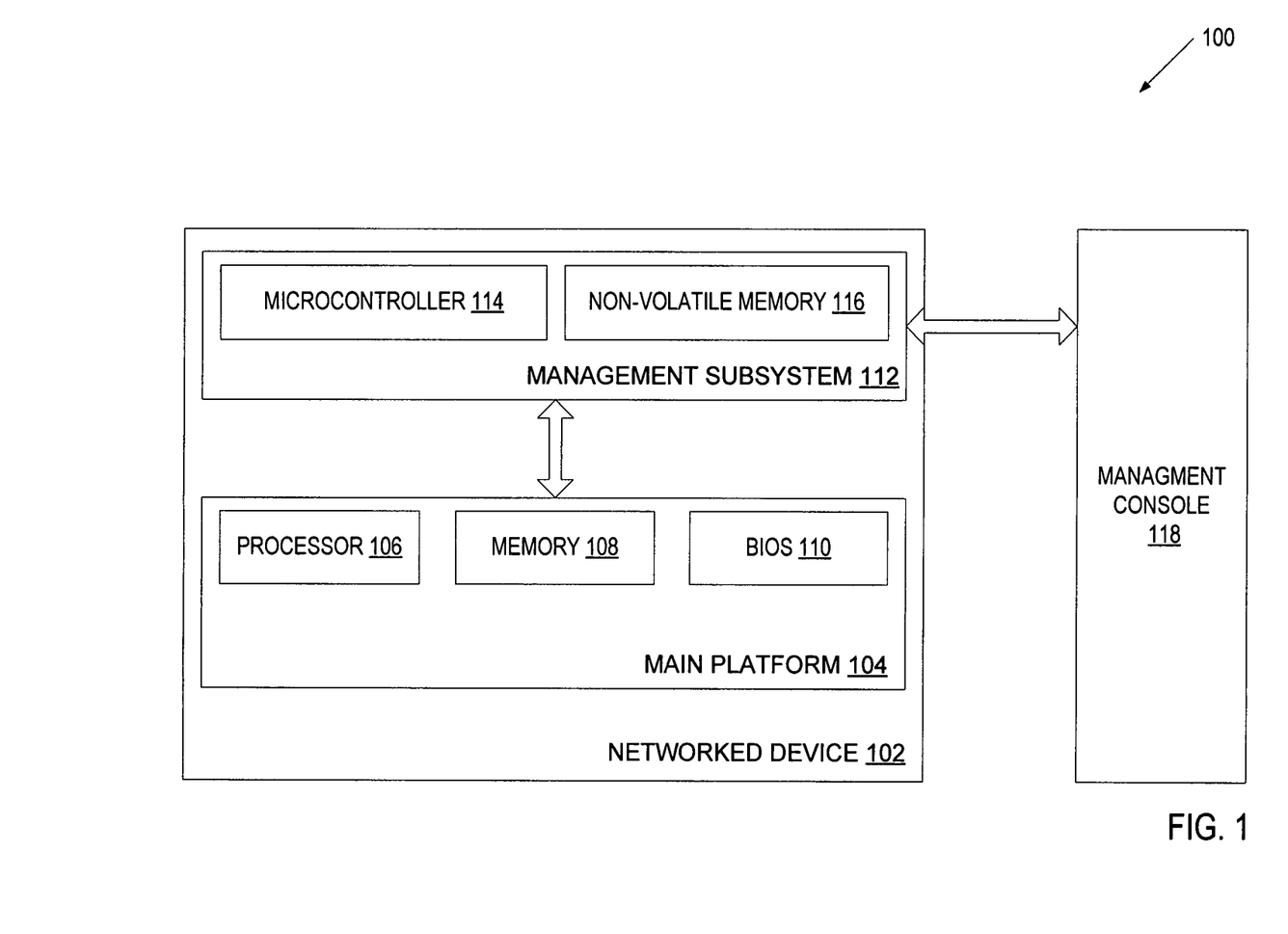
FIG. 1 illustrates a block diagram of one embodiment of a system for provisioning new networked devices.

FIG. 1 illustrates a block diagram of one embodiment of a system 100 for provisioning new networked devices. The system 100 includes a new networked device 102 received from an original equipment manufacturer (OEM) supplier. Alternatively, the networked device 102 may be an existing device that needs to be re-configured or re-deployed due, for example, to its transfer to a different location. The networked device 102 may be, for example, a personal computer (PC), a handheld device, a portable computer, a set-top box, etc. The networked device 102 is coupled to a management console 118 via a network (e.g., a local network such as LAN or Ethernet or a public network such as Internet). The management console 118 may be a computer system (e.g., server, PC, handheld device, portable computer, set-top box, etc.) used by an information technology (IT) administrator or system administrator to control the operation of multiple networked devices.

The networked device 102 includes a main platform 104 and a management subsystem 112. The main platform 104 includes a processor 106 and memory 108. The processor 106 may be a microprocessor, digital signal processor, microcontroller, or the like. Although FIG. 1 shows only one such processor 106, there may be one or more processors in the system. The processor 106 may include microcode, programmable logic or hardcoded logic for performing the execution of method embodiments of the present invention. Memory 108 can be a hard disk, a floppy disk, random access memory (RAM), read only memory (ROM), flash memory, any combination of the above devices, or any other type of machine medium readable by processor 108. The memory 108 may store instructions and/or data for performing the execution of method embodiments of the present invention. The main platform 104 also includes a basic input/output system (BIOS) 110 that may be placed in a ROM or Flash chip by the OEM.

The management subsystem 112 is an embedded system that may include, for example, a microcontroller (or a network controller) 114 and non-volatile memory 116. The microcontroller 114 may include microcode, programmable logic or hardcoded logic for performing the execution of method embodiments of the present invention. The non-volatile memory 116 may be flash memory or any other type of machine medium readable by microcontroller 114. The non-volatile memory 116 may store instructions and/or data for performing the execution of method embodiments of the present invention. The management subsystem 112 may communicate with the BIOS 110 through a host interface (e.g., a 16 bit bi-directional register interface).

In one embodiment, the main platform 104 includes an operating system installed by the OEM prior to delivering the networked device 102 to the customer site. Alternatively, the main platform 104 is a bare-metal system that does not have an operating system on it.

The management subsystem 112 is responsible for provisioning the main platform 104. The provisioning is performed irrespective of the presence of an operating system on the main platform 104 and without any participation of an operating system if it is present on the main platform 104.

In one embodiment, the memory 108 includes a non-volatile storage device that stores data identifying a deployment mode. In one embodiment, the deployment mode is either an enterprise mode or a small business mode. In one embodiment, the OEM supplier sets a default deployment mode by writing a protected word to the rewritable non-volatile storage when building the networked device 102. In one embodiment, the management subsystem 112 can read and write protected words to the non-volatile storage of the main platform 104.

In the enterprise deployment mode, the management subsystem 112 provisions the main platform 104 using a provisioning server that provides configuration information to the management subsystem, as will be discussed in more detail below in conjunction with FIGS. 3-5.

In the small business deployment mode, the management subsystem 112 provisions the main platform 104 using the management console 118 that provides configuration information to the management subsystem, as will be discussed in more detail below in conjunction with FIGS. 6 and 7.

Upon receiving the configuration information, the management subsystem 112 stores it to the memory 108 of the main platform 104 and resets the processor 106, completing the provisioning process. Next, the management subsystem 112 notifies the management console 118 that the networked device 102 is ready for deployment. The management console 118 then initiates the installation of the company-approved operating system and software applications on the networked device 102 over the network.

Figure 2:
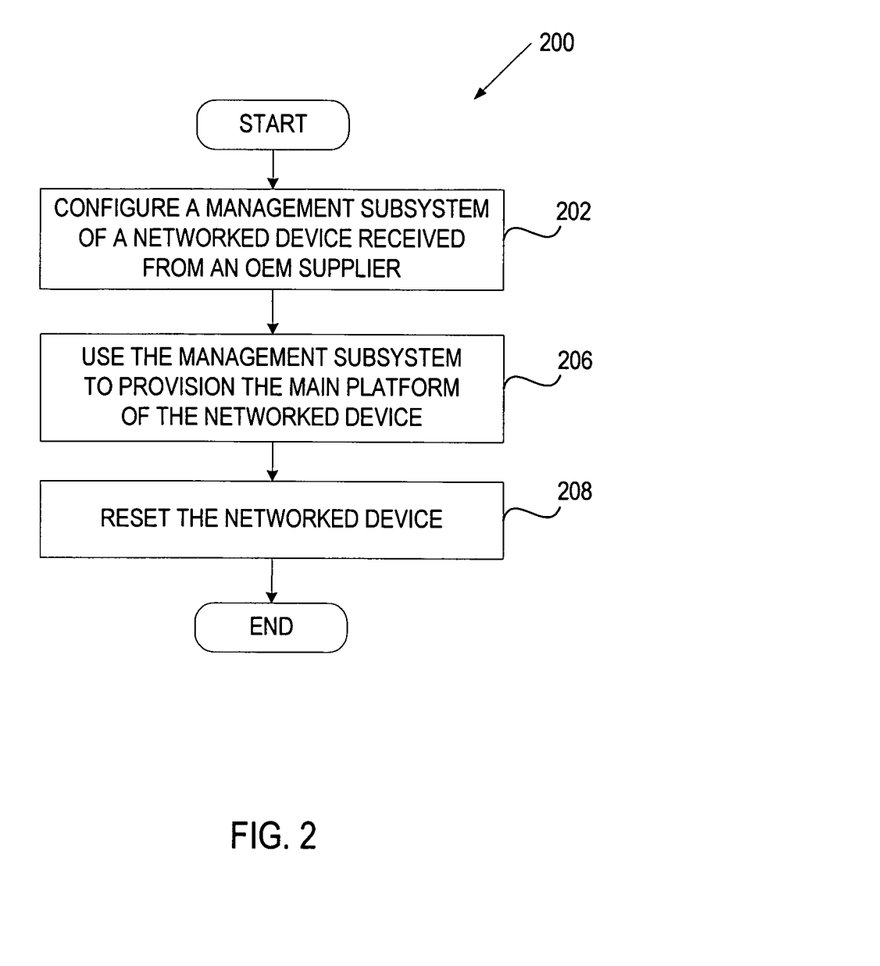
FIG. 2 is a flow diagram of one embodiment of a process for provisioning new networked devices.

FIG. 2 is a flow diagram of one embodiment of a process 200 for provisioning a new networked device. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 200 is performed by a management subsystem 112 of FIG. 1. Alternatively, process 200 is performed by the main platform 104 of FIG. 1.

Referring to FIG. 2, process 200 begins with processing logic configuring a management subsystem of a networked device received from an OEM supplier (processing block 202). In one embodiment, processing logic configures the management subsystem automatically, without any user interaction, by requesting configuration data from a provisioning server on an isolated sub-network (subnet) once the device is turned on, as will be discussed in greater detail below in conjunction with FIGS. 3-5.

In another embodiment, processing logic configures the management subsystem based on configuration data provided by an IT employee, as will be discussed in more detail below in conjunction with FIGS. 6-7.

At processing block 206, processing logic uses the management subsystem to provision the main platform of the networked device. The provisioning of the main platform (as well as the management system itself) is performed irrespective of the presence of an operating system on the main platform and without any participation of an operating system if it is present on the main platform. In one embodiment, processing logic provisions the main platform automatically based on configuration information provided by a provisioning server connected to the isolated subnet, as will be discussed in greater detail below in conjunction with FIGS. 3-5. In another embodiment, processing logic provisions the main platform based on configuration information provided by a management console, as will be discussed in more detail below in conjunction with FIGS. 6-7.

Next, processing logic resets the networked device (processing block 208), completing the provisioning.

Exemplary deployment modes will now be discussed in more detail.

Figure 3:
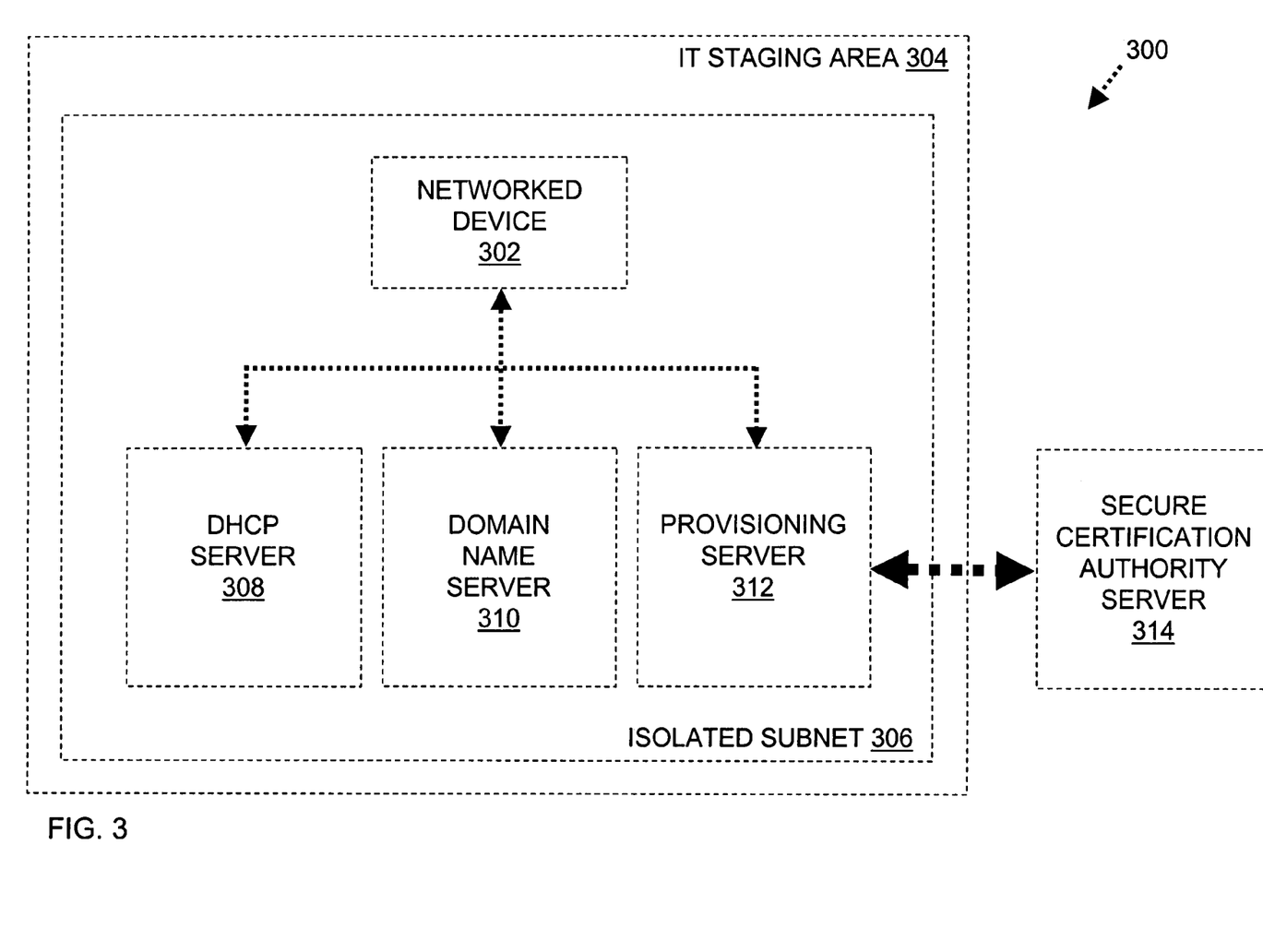
FIG. 3 illustrates a block diagram of one embodiment of a system for provisioning networked devices in an enterprise deployment mode.

FIG. 3 illustrates a block diagram of one embodiment of a system 300 for provisioning networked devices in an enterprise deployment mode using an isolated subnet.

Referring to FIG. 3, system 300 includes a networked device 302 and an isolated subnet 306 which are contained in the company's IT staging area 304. The isolated subnet 306 is used for highly secure, infrastructure-ready provisioning of the networked device 302.

In one embodiment, the isolated subnet 306 contains a Dynamic Host Control Protocol (DHCP) server 308 for assigning Internet Protocol (IP) addresses to nodes and a provisioning server 312 with an additional secured connection to a Certificate Authority (CA) server 314 for issuing digital identity certificates to nodes. The secure connection between the provisioning server 312 and secure CA server 314 may be achieved using a transport layer security (TLS) protocol.

In one embodiment, the isolated subnet 306 also includes a Domain Name server (DNS) 310 to perform translations between domain names and IP addresses.

In one embodiment, the networked device 302 is set by the OEM supplier during manufacturing to a default deployment mode with DHCP and TLS protocols enabled. In this embodiment, once the networked device is connected to the isolated subnet 306 and the device power is turned on, an IT technician via the networked device's local manageability configuration screen may enter factory-default username and password login information. When this first login occurs, the IT technician may be requested to change the factory default username and password to different values known only by the provisioning server 312. This requirement is based on experience with IT technicians who never remove the factory default username and password, thus opening their platforms to trivial subversion. This also prevents provisioning masquerade attacks that could be mounted based on presumably well-known factory default username/password values.

Once the username/password have been changed, the IT technician may logout of the networked device's manageability configuration screen. At that point, the management subsystem of the networked device 302 requests an IP address from the DHCP server 308. In response, the DHCP server 308 provides an IP address and domain name for the networked device 302 and the IP address for the DNS server 310. Then, the management subsystem of the networked device 302 contacts the DNS server 310 and requests the address of the provisioning server 312.

The DNS server 310 replies with the address of the provisioning server 312, and the management subsystem of the networked device 302 initiates a standard protocol connection (e.g., TCP) to an isolated interface of the provisioning server 312. The provisioning server 312 records the IP address of the management subsystem of the networked device 302 and terminates the standard protocol connection.

The provisioning server 312 then initiates a standard protocol connection back to the management subsystem of the network device 302 using the previously recorded IP address. Once connected, the provisioning server 312 logs into the management subsystem using the new username and password that matches the one previously entered by the IT technician and uploads identifying information of the networked device 302 (e.g., a universal unique identifier (UUID)).

The provisioning server 312 then generates security codes (e.g., a key pair generated using a public-key encryption technology developed by RSA Data Security, Inc.) and other data and combines this data along with the UUID of the networked device 302 into a certificate request and forwards this request to the secure CA server 314.

The secure CA server 314 generates the requested certificate and returns it to the provisioning server 312. The provisioning server 312 will then generate or collect various other data such as, for example, a fully qualified domain name, a random number generator (RNG) secret key, access control lists, a current date and time, etc.

The provisioning server 312 downloads this information to the management subsystem of the networked device 302 which stores this information in non-volatile memory of the main platform. When the download and storage operations are complete, the management subsystem of the networked device 302 resets the networked device 302, completing the provisioning process. The provisioning server 312 then notifies the management console (outside the isolated subnet 306) that the networked device 302 is ready for deployment.

Figure 4:
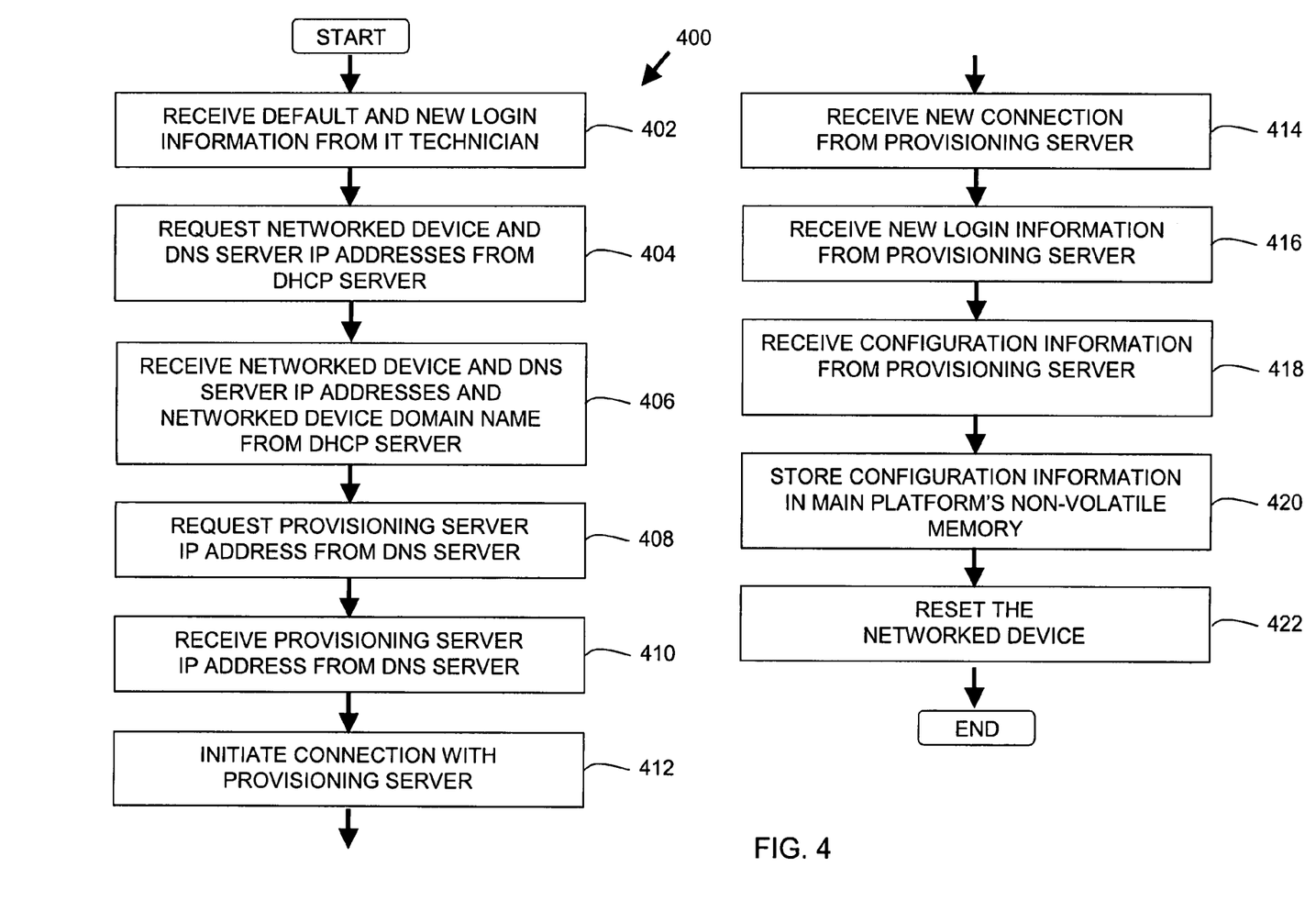
FIGS. 4 and 5 are flow diagrams of two embodiments of a process for provisioning networked devices in an enterprise deployment mode.

FIG. 4 is a flow diagram of one embodiment of a process 400 for provisioning a networked device in an enterprise environment with an isolated subnet containing a DHCP server, a DNS server, and a provisioning server. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 400 is performed by a management subsystem 112 of FIG. 1.

Referring to FIG. 4, process 400 begins with processing logic receiving default and new login information specified by an IT technician via the networked device's local manageability configuration screen (processing block 402).

At processing block 404, processing logic requests an IP address for the networked device and for the DNS server from the DHCP server.

At processing block 406, processing logic receives an IP address and domain name for the networked device and an IP address for the DNS server from the DHCP server.

At processing block 408, processing logic contacts the DNS server to request the IP address for the provisioning server.

At processing block 410, processing logic receives the IP address of the provisioning server.

Next, processing logic initiates a connection with the provisioning server (processing block 412). The provisioning server records the IP address of the networked device and terminates the connection.

At processing block 414, the networked device receives a new connection from the provisioning server. Processing logic then receives new login information from the provisioning server (processing block 416) and if valid, allows the provisioning server to upload the identifier of the networked device (e.g., a universal unique identifier (UUID)).

At processing block 418, processing logic receives from the provisioning server a set of configuration information such as a certificate, security codes (e.g., RSA key pair), a fully qualified domain name, RNG secret key, access control lists, a current date and time, etc.

At processing block 420, processing logic stores this configuration information into the non-volatile memory of the main platform.

Further, processing logic resets the processor of the networked device (processing block 422), and the provisioning server notifies the management console that the networked device is ready for deployment.

Accordingly, process 400 provides a completely automated provisioning of networked devices.

Some enterprises may not have an infrastructure shown in FIG. 3. For example, an enterprise may not have an isolated DHCP server and/or an isolated DNS server. FIG. 5 is a flow diagram of one embodiment of a process 500 for provisioning a networked device in an enterprise environment with an isolated subnet containing a provisioning server but without a DHCP server and without a DNS server. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 500 is performed by a management subsystem 112 of FIG. 1.

Figure 5:
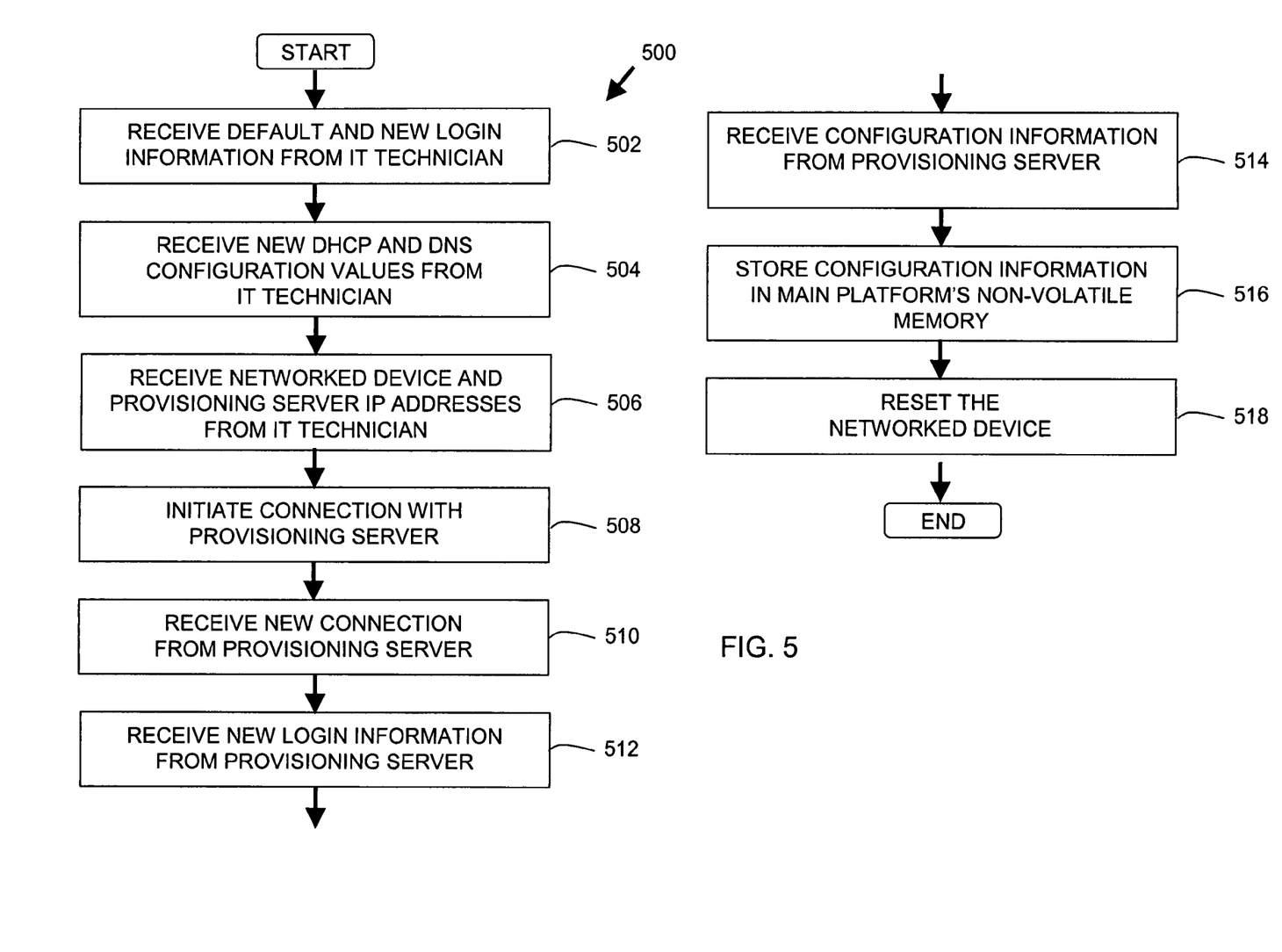

Referring to FIG. 5, process 500 begins with processing logic receiving default and new login information specified by an IT technician via the networked device's local manageability configuration screen (processing block 502).

At processing block 504, processing logic updates factory-default configuration values based on input from the IT technician to indicate that the DHCP and DNS services are not available in the present deployment environment. In one embodiment, processing logic updates the DHCP and DNS configuration values by manipulating relevant bits in a protected word stored in the non-volatile memory of the main platform.

At processing block 506, processing logic receives the IP address for the networked device and the provisioning server from the IT technician.

Next, processing logic initiates connection with the provisioning server (processing block 508). The provisioning server records the IP address of the networked device and terminates the connection.

At processing block 510, the networked device receives a new connection from the provisioning server. Processing logic then receives new login information from the provisioning server (processing block 512) and if valid, allows the provisioning server to upload the identifier of the networked device (e.g., a universal unique identifier (UUID)).

At processing block 514, processing logic receives from the provisioning server a set of configuration information such as a certificate, security codes (e.g., RSA key pair), a fully qualified domain name, RNG secret key, access control lists, a current date and time, etc.

At processing block 516, processing logic stores this configuration information into the non-volatile memory of the main platform.

Further, processing logic resets the processor of the networked device (processing block 518), and the provisioning server notifies the management console that the networked device is ready for deployment.

It should be noted that process 500 can be modified to accommodate different configurations of the enterprise environment (e.g., with an isolated DNS server but without an isolated DHCP server).

Figure 6:
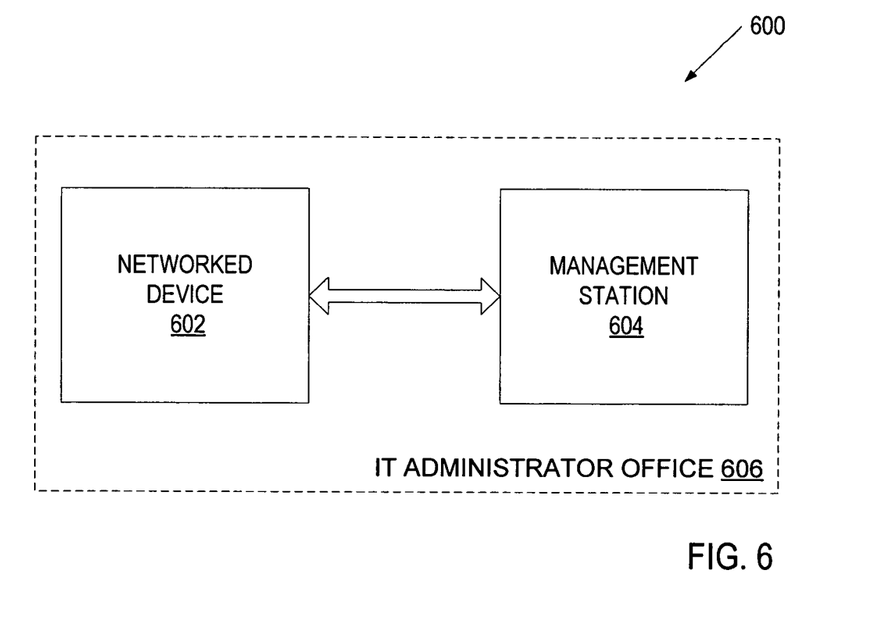
FIG. 6 illustrates a block diagram of one embodiment of a system for provisioning networked devices in a small-business deployment mode.

FIG. 6 illustrates a block diagram of one embodiment of a system 600 for provisioning networked devices in a small-business deployment mode. System 600 can be used by a small single-site business whose entire site network can be treated as an isolated subnet.

Referring to FIG. 6, system 600 includes a networked device 602 and a management station 604. The networked device 602 and the management station 604 may be located in the company's IT administrator office 606 and be connected to each other via a standard network connection.

In a small business environment, the IT administrator may turn the networked device 602 power on and then, via the networked device's local manageability configuration screen, enter factory-default username and password login information. When this first login occurs, the IT administrator may be requested to change the factory default username and password to different values known only by the IT administrator.

Next, the IT administrator enters an IP address for the networked device 602 and logs out of the networked device's manageability configuration screen. Subsequently, the IT administrator may open the web browser on the management station 604 and enter the networked device's IP address in the web browser address bar. The management station 606 then initiates a standard protocol connection (e.g., TCP) to the management subsystem of the networked device 602 and accesses the manageability subsystem's web pages, which contain a login screen.

Further, the IT administrator logs in using the new username and password for the networked device 602, and enters configuration data into configuration web page(s) as required. The configuration data may include, for example, a fully qualified domain name (FQDN), DNS IP address, default gateway IP address, RNG secret key, current date and time, access control lists, etc.

Once the IT administrator finishes entering the configuration data, the management subsystem of the networked device 602 resets the networked device 602, completing the provisioning process.

Figure 7:
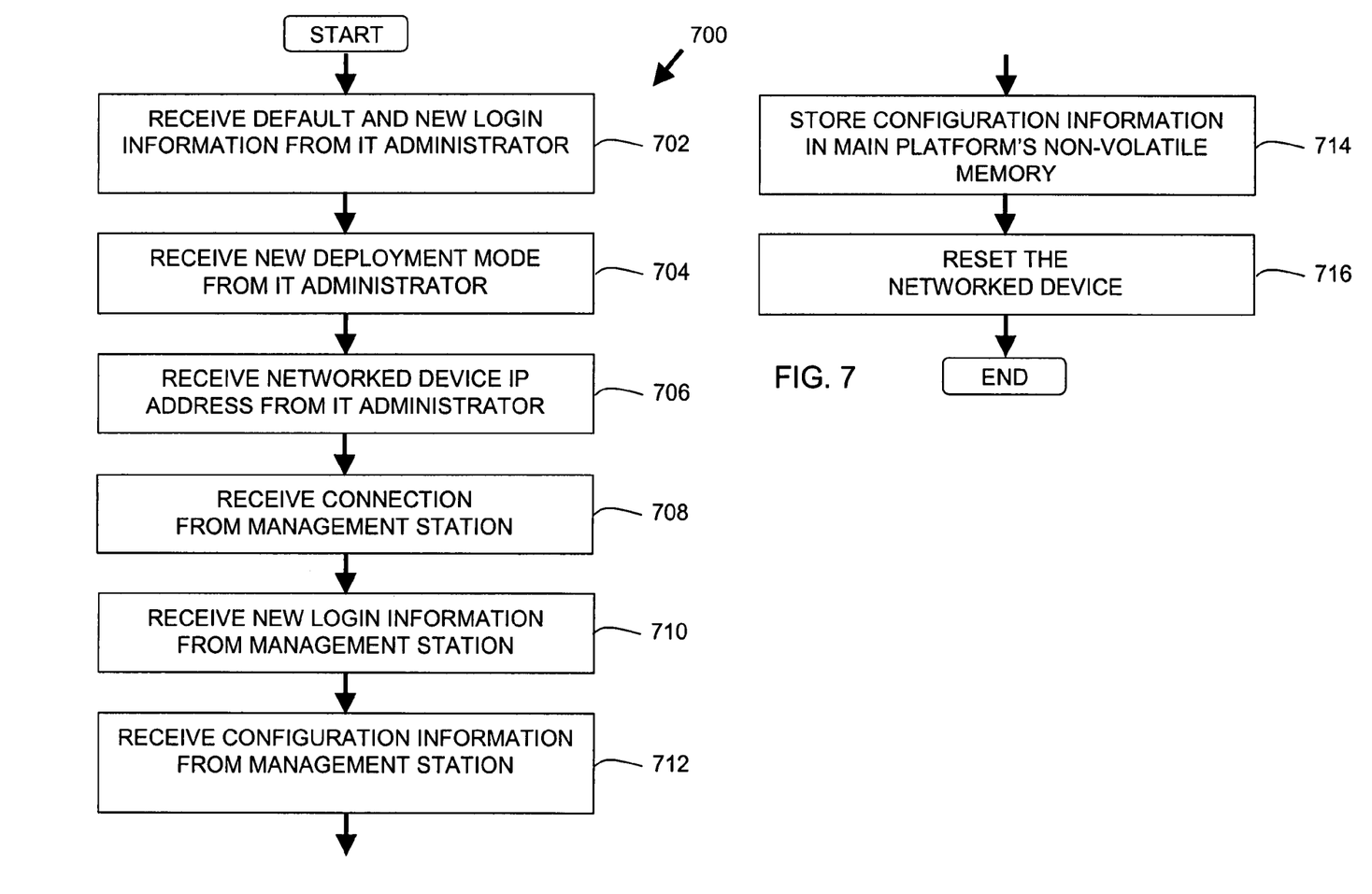
FIG. 7 is a flow diagram of one embodiment of a process for provisioning networked devices in a small-business deployment mode.

FIG. 7 is a flow diagram of one embodiment of a process 700 for provisioning networked devices in a small-business deployment mode. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 700 is performed by a management subsystem 112 of FIG. 1.

Referring to FIG. 7, process 700 begins with processing logic receiving default and new login information specified by an IT administrator via the networked device's local manageability configuration screen (processing block 702).

At processing block 704, processing logic updates the factory-default deployment mode from enterprise mode to small-business mode based on input from the IT administrator. In one embodiment, processing logic updates the deployment mode by manipulating relevant bits in a protected word stored in the non-volatile memory of the main platform. In one embodiment, if changing the deployment mode requires predefined changes in related data (e.g., security or host-configuration settings), processing logic makes these predefined changes along with changing the deployment mode.

At processing block 706, processing logic receives the IP address of the networked device from the IT administrator.

At processing block 708, the networked device receives a standard protocol connection from the management station. Processing logic then receives new login information from the management station (processing block 710) and if valid, allows access to the management subsystem's web pages.

At processing block 712, processing logic receives from the management station a set of configuration information including, for example, fully qualified domain name, RNG secret key, DNS IP address, default gateway IP address, access control lists, a current date and time, etc.

At processing block 714, processing logic stores this configuration information into the non-volatile memory of the main platform.

Further, processing logic resets the processor of the networked device (processing block 716) completing the provisioning process. The networked device is then ready for deployment.

It should be noted that process 700 can be modified to accommodate a different configuration of the small business environment (e.g., if a DHCP server is available).

Thus, a method and apparatus for provisioning new networked devices have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A networked device comprising:
   a main platform comprising a processor, a memory, and a basic input/output system (BIOS); and
   an embedded management subsystem coupled to the main platform, wherein the management subsystem accesses a non-volatile storage device storing identifying data that identifies a deployment mode of the networked device to determine the deployment mode and to provision the main platform based on the determined deployment mode, irrespective of whether an operating system or applications have been installed on the main platform, wherein the deployment mode identifies one or more networked configuration devices from which the management subsystem receives configuration information via a network,
   wherein based on the determined deployment mode being a first deployment mode, the management subsystem is configured to:
      initiate a connection to a provisioning server, which is one of the one or more networked configuration devices, to provide the provisioning server an address of the networked device,
      receive a new connection from the provisioning server after providing the address to the provisioning server,
      allow the provisioning server to log into the management subsystem using a username and a password and using the new connection,
      receive, using the new connection, the configuration information from the provisioning server,
      store the configuration information into the memory of the main platform, and
      reset the main platform,
   wherein when the determined deployment mode is a second deployment mode, the management subsystem is configured to:
      receive an address for the network device,
      receive a connection from a management console using the address,
      allow the management console to log into the management subsystem using the username and the password,
      receive the configuration information from the management console, and
      reset the main platform to complete provisioning of the main platform based on the configuration information,
         wherein the management console is one of the one or more networked configuration devices,
      wherein the first deployment mode is selected as a default mode and the second deployment mode is manually selected based upon input,
      wherein the configuration information is used to provision the main platform for deployment or redeployment on the network.

2. The device of claim 1 further comprising:
   a host interface to enable communication between the BIOS and the management subsystem.

3. The device of claim 1 wherein the management subsystem is to communicate to the management console via a network.

4. The device of claim 1 wherein the configuration information is selected from the group consisting of an identifier of the device, a certificate generated by a certificate authority server for the device, security codes, a domain name, current date and time, and an access control list.

5. The device of claim 1 wherein if the determined deployment mode is a first deployment mode, the management subsystem is to obtain an Internet Protocol (IP) address of the provisioning server by requesting an IP address of a Domain Name Service (DNS) server from an isolated Dynamic Host Control Protocol (DHCP) server, receiving an IP address of the networked device and the IP address of the DNS server from the DHCP server, requesting an IP address of a provisioning server from the DNS server, and receiving the IP address of the provisioning server from the DNS server.

6. A method comprising:
   configuring, by a networked device, a management subsystem of the networked device;
   determining, by the management subsystem, a deployment mode of the networked device, the determining comprising accessing data identifying the deployment mode in a non-volatile memory, wherein the deployment mode identifies one or more networked configuration devices from which the management subsystem receives configuration information via a network and defines a content of the configuration information to be received from the one or more networked configuration devices; and
   using the management subsystem to provision the main platform of the networked device based on the determined deployment mode, irrespective of whether an operating system or applications have been installed on the main platform,
      wherein provisioning the main platform comprises:
         communicating with a provisioning server as one of the one or more networked configuration devices,
         initiating a connection to the provisioning server to provide the provisioning server an address of the networked device,
         receiving a new connection from the provisioning server after providing the address to the provisioning server,
         allowing the provisioning server to log into the management subsystem using a username and a password and using the new connection,
         receiving, using the new connection, the configuration information from the provisioning server,
         storing the configuration information into the memory of the main platform, and
         resetting the main platform,
      based on the determined deployment mode being a first deployment mode,
         receiving an address for the network device,
         communicating with a management console as one of the one or more networked configuration devices using the address,
         allowing the management console to log into the management subsystem using the user name and password,
         receiving the configuration information from the management console, and
         resetting the main platform to complete provisioning of the main platform based on the configuration information,
      based on the determined deployment mode being a second deployment mode, and
   storing the configuration information in the non-volatile memory.

7. The method of claim 6 wherein configuring the management subsystem comprises:
   obtaining an IP address for the networked device.

8. The method of claim 6 wherein communicating with the provisioning server comprises:
    obtaining an Internet Protocol (IP) address for the provisioning server.

9. The method of claim 6 wherein the configuration information is selected from the group consisting of an identifier of the device, a certificate generated by a certificate authority server for the device, security codes, a domain name, current date and time, and an access control list.

10. The method of claim 8 wherein obtaining the IP address of the provisioning server comprises:
    requesting an IP address for a Domain Name Service (DNS) server from an isolated Dynamic Host Control Protocol (DHCP) server;
    receiving the IP address of the DNS server from the DHCP server;
    requesting an IP address for a provisioning server from the DNS server; and
    receiving the IP address of the provisioning server from the DNS server.

11. The method of claim 8 wherein the IP address of the provisioning server is obtained based on input provided by an IT technician or IT administrator.

12. The method of claim 6 wherein the deployment mode determines whether the networked device will be assigned an automatically assigned, dynamic, short-term IP address from a Dynamic Host Control Protocol (DHCP) server or the networked device will be assigned a manually entered IP address from an IT administrator.

13. The method of claim 6 wherein the configuration information includes a random number generator (RNG) secret key.

14. A machine-readable storage medium containing instructions which, when executed by a processing system, cause the processing system to perform a method, the method comprising:
    configuring a management subsystem of a networked device;
    determining a deployment mode of the networked device, the determining comprising accessing data identifying the deployment mode in a non-volatile memory of the networked device, wherein the deployment mode identifies one or more networked configuration devices from which the management subsystem receives configuration information via a network; and
    using the management subsystem to provision the main platform of the networked device based on the determined deployment mode, irrespective of whether an operating system or applications have been installed on the main platform,
    wherein provisioning the main platform comprises:
        communicating with a provisioning server as one of the one or more networked configuration devices,
        initiating a connection to the provisioning server to provide the provisioning server an address of the networked device,
        receiving a new connection from the provisioning server after providing the address to the provisioning server,
        allowing the provisioning server to log into the management subsystem using a username and a password and using the new connection,
        receiving, using the new connection, the configuration information from the provisioning server,
        storing the configuration information into the memory of the main platform, and
        resetting the main platform,
    based on the determined deployment mode being a first deployment mode,
        receiving an address for the network device,
        communicating with a management console as one of the one or more networked configuration devices using the address,
        allowing the management console to log into the management subsystem using the user name and password,
        receiving the configuration information from the management console, and
        resetting the main platform to complete provisioning of the main platform based on the configuration information,
    based on the determined deployment mode being a second deployment mode, and
    storing the configuration information in the non-volatile memory.

* * * * *